United States Patent [19]
Betts

[11] 3,991,384
[45] Nov. 9, 1976

[54] ULTRAVIOLET CHEMICAL LASER

[75] Inventor: Jeanette A. Betts, Hermosa Beach, Calif.

[73] Assignee: TRW Inc., Redondo Beach, Calif.

[22] Filed: Apr. 28, 1975

[21] Appl. No.: 572,676

[52] U.S. Cl. .................. 331/94.5 G; 331/94.5 P; 330/4.3; 204/157.1 R; 313/223
[51] Int. Cl.² .................................................. H01S 3/22
[58] Field of Search ............. 331/94.5 G, 94.5 P, 331/94.5 PE; 330/4.3; 204/157.1 R; 313/223

[56] References Cited
OTHER PUBLICATIONS

Taylor et al.; J. Molecular Spectroscopy, 44 (1), pp. 108–117—Chem. Abstract Only—No. 120167, vol. 77, 1972.

Betts, AFWL—TR—74-165—Abstract Only—Con't. Reports Announcements, June 13, 1975, p. 65.

*Primary Examiner*—Robert J. Webster
*Attorney, Agent, or Firm*—Daniel T. Anderson; Edwin A. Oser; Alan A. Akers

[57] ABSTRACT

The lasing species of CS($a^3\pi$) and CSe($a^3\pi$) are produced by reacting atomic carbon and COS or COSe in an inert medium such as helium, argon, nitrogen, etc.

4 Claims, 5 Drawing Figures

ULTRAVIOLET CHEMICAL LASER

The invention herein described was made in the course of or under a contract or subcontract thereunder, with the Department of the Air Force.

BACKGROUND OF THE INVENTION

This invention relates to a chemical laser and, more specifically, to an ultraviolet chemical laser in which the lasing species is either CS or CSe.

The emission of chemical lasers are usually to be found in the infrared or visible spectrum. Chemical lasers (of the combustion driving type) typically employ HF and DF as the lasing species; transfer lasers, where $CO_2$ is the lasing species, are also known. However, all these species lase in the infrared, not the ultraviolet spectrum. Obviously, use of an ultraviolet chemical laser is preferable to a laser emitting in the infrared or visible if greater penetration into the atmosphere is desired. Gas phase lasers emitting in the U.V. spectrum are also known but are very difficult to scale up.

According to the invention, there is provided a method and apparatus for producing a laser having an output in the ultraviolet spectrum (3500A–4500A) which comprises the steps of: reacting atomic carbon in an inert diluent gas to produce CS and CSe molecules in the $a^3\pi$ state; pumping the CS and CSe($a^3\pi$) molecules in an optical cavity, and emitting ultraviolet lasing radiation from the cavity.

The invention will be understood by reference to the diagrams in which.

Preferably, the atomic carbon is reacted with COS to form CS in the inverted state according to the following equation:

Similarly, atomic carbon is reacted with COSe to form CSe in the inverted state according to the following equation:

Lasing will occur at 3625A for CS, while the CSe will lase principally at 4097A and 4148A.

EXAMPLE 1

Figure 1:
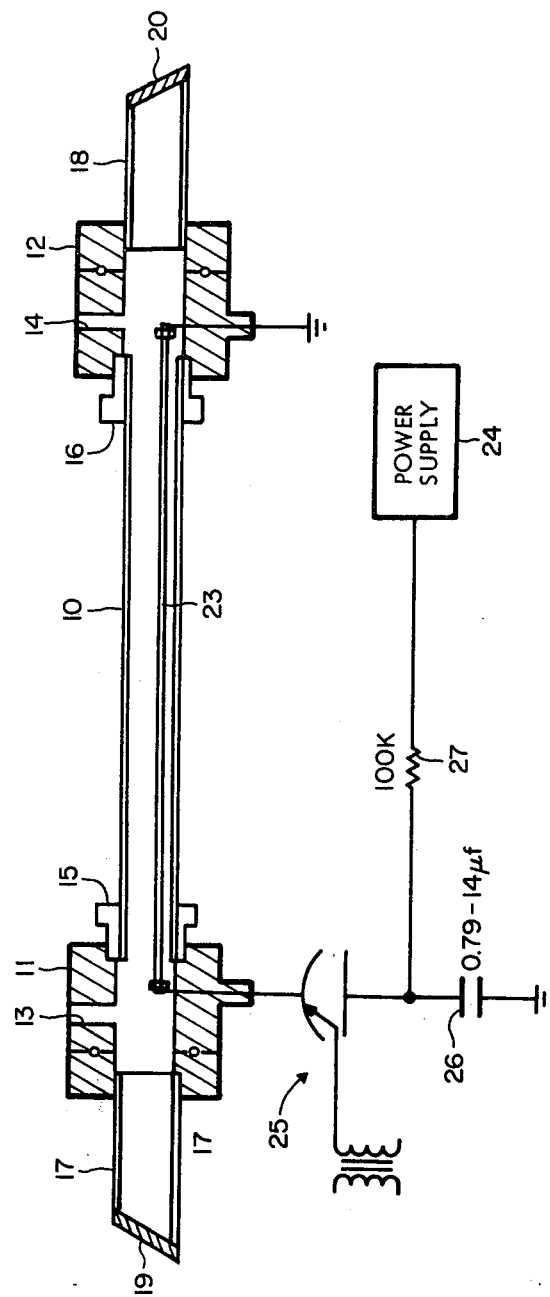
FIG. 1 is a view, in axial section, of one form of apparatus suitable for producing U.V. lasing.

CS in the ($a^3\pi$) state is produced by an exploding wire technique; this provides a high density source of carbon atoms for the pumping reactions. The apparatus is shown in FIG. 1 and comprises an elongated pyrex tube 10 having aluminum end pieces 11, 12 which function both as electrical connectors and tube holders. The connectors 11, 12 are provided with gas inlet ports 13 and 14. Ring connections 15 and 16 are employed to mount the connectors 11 and 12 to the pyrex tube 10. Pyrex tubes 17 and 18 having quartz windows 19, 20 at each end are mounted at the end of connectors 11 and 12 respectively; windows 19, 20 function as Brewster angle windows.

Figure 2:
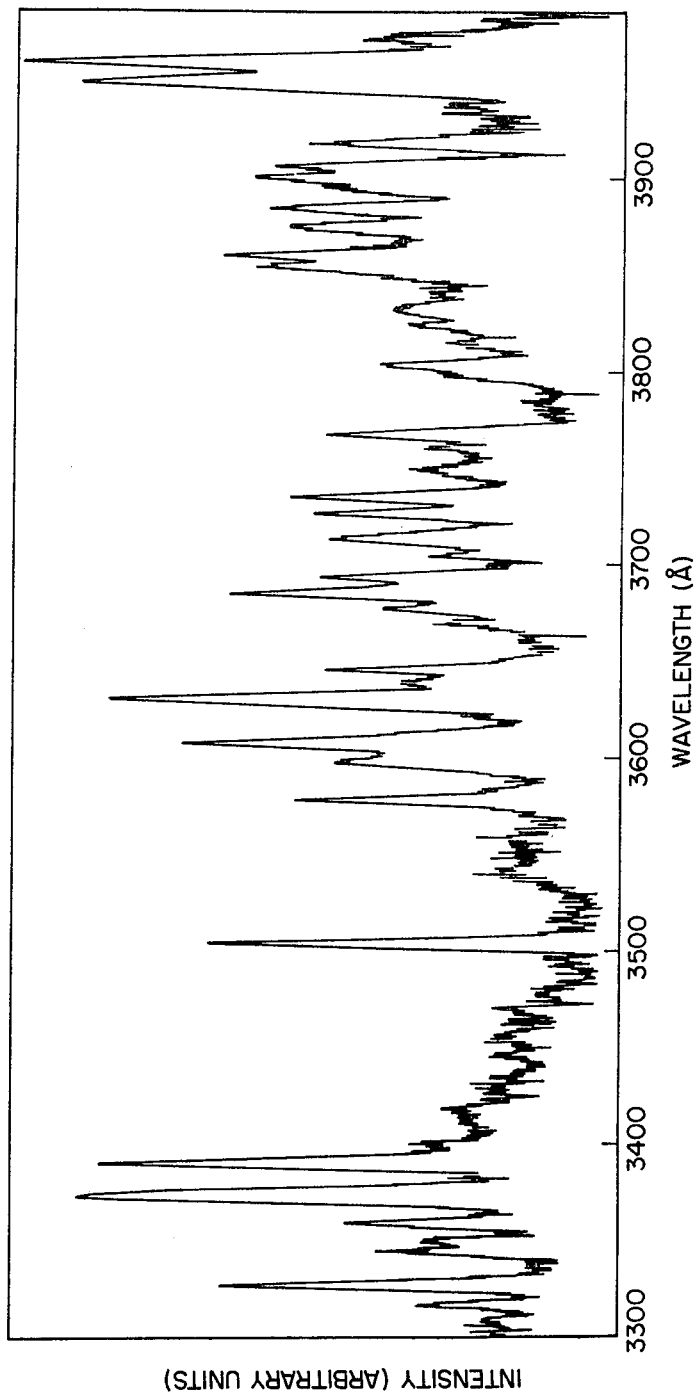
FIG. 2 is a graph of a densitometer trace of CS($a^3\pi$) emission.

A pyrex rod 23 is mounted inside the tube 10 and is coated with carbon, such as graphite. When heated rapidly with an electrical pulse, the graphite will evaporate and provide a source of free carbon atoms which are employed to combine with the COS or COSe to produce the inverted population state. One end of the pyrex rod is grounded to the connector 12 while the other end of the pyrex rod is connected to a power supply 24 through an ignitron 25 and an RC pulse forming circuit 26, 27. Application of an electrical pulse to the pyrex rod 23 has the effect of causing the rod to act as a flash lamp. For lasing purposes, a cavity (not shown) external to the system in FIG. 1 was provided and included two mirrors of 2 meters radius, both mirrors having a dielectric coating with >99% reflectivity at 3625A. Using various mixtures of COS, $C_3O_2$ and He, at pressures ranging from 1 to 10 torr, to produce CS($a^3\pi$), a line near 3625A was observed; this is the emission line of CS($a^3\pi$). A densitometer trace of the resulting spectrum is shown in FIG. 2.

EXAMPLE 2

In a similar experiment using the apparatus of FIG. 1, atomic carbon was reacted with carbonyl selenide (COSe) to form the inverted species CSe($a^3\pi$).

Figure 3:
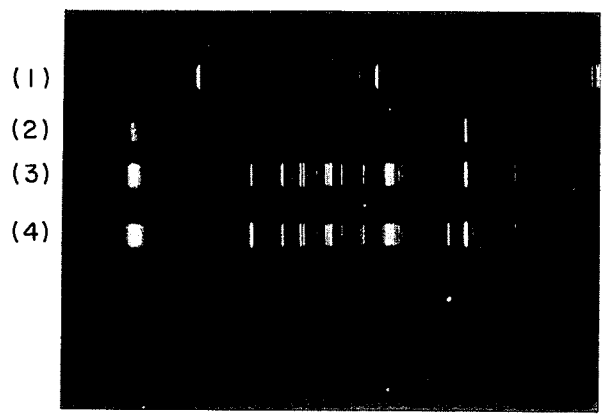
FIG. 3 are spectra showing CSe($a^3\pi$) emission.

FIG. 3 are spectra showing the results of the experiments. The first spectrum (band 1) is the mercury spectrum which is employed as a calibration. The farthest line to the left is at 4358A and the one at the far right is at 3650A. The second spectrum (band 2) is formed by firing the device with 12 torr of helium; the line at the right is the 3888A line of helium. The third spectrum (band 3) is formed by firing the device with 10 torr helium and 1 torr of COSe. There are lines corresponding to lines in the CSe($a^3\pi$) spectrum. The fourth spectrum occurs as a result of firing the device with 10 torr helium, 1 torr COSe, and 1 torr $C_3O_2$. Lines at approximately 4265A and 3920A appear to be enhanced by the chemical pumping of $C_3O_2$. For lasing purposes, very rapid (less than 1 microsecond) production of carbon atoms would be desirable in the optimum lasing system.

EXAMPLE 3

Figure 4:
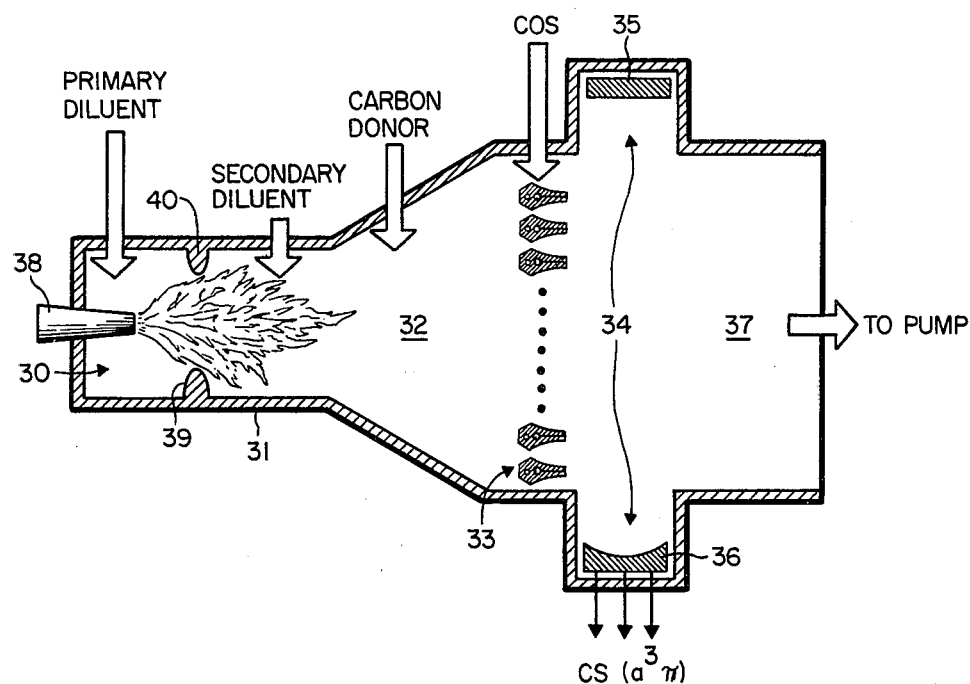
FIG. 4 is a view, in axial section, of a C-W chemical laser for producing U.V. emission.

The preferred method of producing the carbon atoms in the atomic state employs a continuous wave system in which graphite is arc-heated to generate sufficient atomic carbon atoms for the pumping reaction. FIG. 4 shows an apparatus 30 for this purpose and comprises an arc section 31, a mixer-plenum section 32, a nozzle-bank section 33, an optical cavity section 34 having mirrors 35, 36 and an exhaust 37. An electric arc is provided by supplying current through an electrode 38 which passes through arc elements 39, 40 to form an arc.

Typical arc temperatures vary from about 5000° K to 6000° K. Typical temperatures in the mixer-plenum 32 at the nozzle bank vary from about 2000° K to 2400° K for argon and 3600° K to 4000° K for nitrogen. Cavity temperatures vary from about 500° K to 700° K for both argon and nitrogen.

Typical mixer-plenum pressures vary from about 6 to 30 psia; in the cavity, typical pressures vary from 1 torr to 5 torr.

Figure 5:
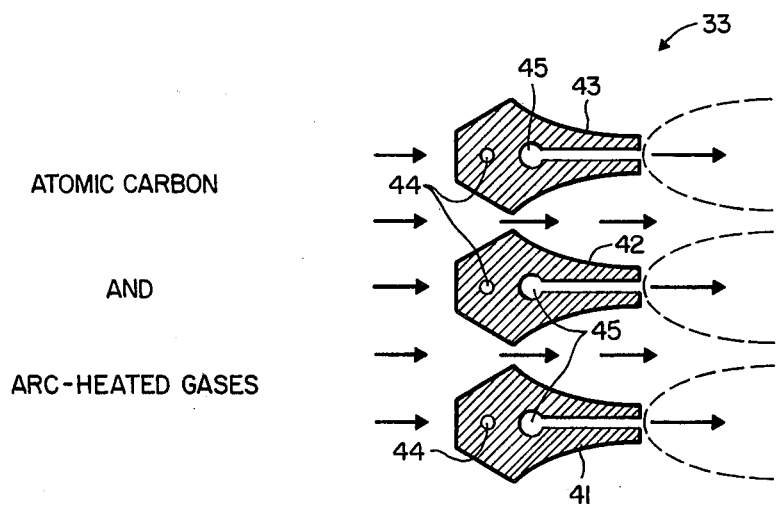
FIG. 5 is an enlarged view of injection nozzles and flow patterns of the reactants in the cavity.

A primary diluent such as nitrogen, helium, argon, etc., is injected into the arc as indicated; a secondary diluent is injected as indicated into the rear portion of the arc if required. A carbon donor such as powdered graphite, ethylene, etc., is injected as shown into the mixer-plenum 32. Following dissociation into atomic carbon in the mixer-plenum and mixing with the diluent gas, the two gases are passed through the nozzle bank and reacted with COS in the cavity 34 to form the lasing species $CS(a^3\pi)$. FIG. 5 illustrates the flow patterns through several nozzles 41, 42, 43 in the nozzle bank 33. The nozzles are adapted to provide an aerodynamic expansion as the cavity gases travel from the plenum to the cavity at supersonic speed and are removed by pumps (not shown) through exhaust 37. Each nozzle is provided with a channel 44 for circulation of a coolant such as water. An injector channel 45 is also provided in each nozzle. This enables a cavity reactant to be injected onto the cavity for rapid mixing and reaction with the atomic carbon. When COS is introduced into channel 45, the lasing species will be $CS(a^3\pi)$ as indicated in the equation, supra. The use of COSe will produce the lasing species $CSe(a^3\pi)$ when reacted with atomic carbon.

Emission from a window replacing mirror 36 was detected with a spectrometer and photomultiplier calibrated at the 0-0 band of $CS(a^3\pi)$ emission. At flow rates of $1.4 \times 10^{-3}$ moles/sec ethylene and $4 \times 10^{-3}$ moles/sec carbonyl sulfide, the line-of-sight emission intensity was $1.9 \times 10^{17}$ photons/sec/cm$^2$ integrated over the 0-0 band. For lifetimes of $10^{-4}$ to $10^{-2}$ seconds, concentrations of the $CS(a^3\pi)$ molecules would be about $2 \times 10^{13}$ to $2 \times 10^{15}$ molecules/cc. Lasing can be achieved when the differences in concentration between the $a^3\pi$ and $X^1\Sigma$ states exceed about $5 \times 10^{14}$ molecules/cc.

A chemical laser emitting in the U.V. spectrum would permit greater penetrating power into the atmosphere with less absorption from water vapor, $CO_2$, etc. Such a laser is capable of being scaled to higher output powers than existing gas phase U.V. lasers and hence new areas of applications could be introduced.

We claim:

1. A process for producing an excited compound of carbon radiating in the U.V. spectrum which comprises the steps of:
    a. reacting atomic carbon in an inert diluent gas with carbonyl sulfide to produce CS in the excited $CS(a^3\pi)$ molecular state, from which the CS molecule relaxes and emits radiation in the U.V.

2. A process for producing an excited compound of carbon radiating in the ultraviolet spectrum which comprises the step of:
    a. reacting atomic carbon in an inert diluent gas with carbonyl selenide to produce CSe in the excited $CSe(a^3\pi)$ molecular state, from which the CS molecule relaxes and emits radiation in the U.V.

3. A process for producing emission from an excited compound of carbon which comprises the steps of:
    a. forming atomic carbon in an inert diluent in a combustion zone;
    b. aerodynamically expanding the atomic carbon and diluent at supersonic velocity into an optical cavity;
    c. aerodynamically expanding carbonyl sulfide into the optical cavity at supersonic velocity; and
    d. reacting the atomic carbon and carbonyl sulfide according to the equation $C(^3P) + COS(X^1\Sigma^+) \rightarrow CS(a^3\pi) + CO(X^1\Sigma) + CO(X^1\Sigma)$, thereby to cause emission of U.V. light from the excited carbonyl sulfide.

4. A process for producing emission from an excited compound of carbon which comprises the steps of:
    a. forming atomic carbon in an inert diluent in a combustion zone;
    b. aerodynamically expanding the atomic carbon and diluent at supersonic velocity into an optical cavity;
    c. aerodynamically expanding carbonyl selenide into the optical cavity; and
    d. reacting the atomic carbon and carbonyl selenide according to the equation $C(^3P) + COSe(X^1\Sigma^+) \rightarrow CSe(a^3\pi) + CO(X^1\Sigma)$, thereby to cause emission of U.V. light from the excited carbonyl selenide.

* * * * *